(12) United States Patent
Wu et al.

(10) Patent No.: US 9,173,263 B2
(45) Date of Patent: Oct. 27, 2015

(54) LIGHT MODULE WITH LINEAR LED SERIAL GROUP DRIVE DEVICE

(71) Applicant: SUNPOWER GRAND HOLDINGS PTE, LTD., Taichung (TW)

(72) Inventors: Yu-Chien Wu, Taichung (TW); Hsien-June Chen, Taichung (TW)

(73) Assignee: Sunpower Grand Holdings Pte. Ltd., Tainchung (TW)

( * ) Notice: Subject to any disclaimer, the term of this patent is extended or adjusted under 35 U.S.C. 154(b) by 0 days.

(21) Appl. No.: 14/202,122

(22) Filed: Mar. 10, 2014

(65) Prior Publication Data

US 2014/0312768 A1    Oct. 23, 2014

(30) Foreign Application Priority Data

Apr. 18, 2013    (TW) .............................. 102207125 U (51) Int. Cl.
  *H05B 37/02*    (2006.01)
  *H05B 33/08*    (2006.01)
(52) U.S. Cl.
  CPC ............. *H05B 33/083* (2013.01); *Y02B 20/341* (2013.01)

(58) Field of Classification Search
  USPC .......... 315/185 R, 186, 192, 209 R, 291, 297, 315/307, 360
  See application file for complete search history.

(56) References Cited

U.S. PATENT DOCUMENTS

| | | | |
|---|---|---|---|
| 8,598,796 B2* | 12/2013 | Jeong .............................. | 315/192 |
| 2006/0208669 A1* | 9/2006 | Huynh et al. .................. | 315/312 |
| 2012/0038615 A1* | 2/2012 | Leung et al. ................... | 345/212 |
| 2012/0081009 A1* | 4/2012 | Shteynberg et al. .......... | 315/122 |
| 2012/0133284 A1* | 5/2012 | Ge et al. ........................ | 315/121 |
| 2013/0162153 A1* | 6/2013 | van de Ven et al. ........... | 315/193 |
| 2013/0169175 A1* | 7/2013 | Grajcar ......................... | 315/193 |

* cited by examiner

*Primary Examiner* — Tung X Le
(74) *Attorney, Agent, or Firm* — Rosenberg, Klein & Lee (57) ABSTRACT

A light module with linear LED serial group drive device comprises an AC input rectifier unit having an input end coupled to an AC Power to convert an AC half-wave voltage signal into a DC full-wave voltage signal for output, and an intelligent control having a protection unit. when the input voltage is higher than the set start voltage of the LED serial group, the corresponding constant current control drive circuit switch is turned on immediately by the intelligent control to control the power, luminous flux, and power factor of the LED serial light module for achieving stable power output of LED light source. Moreover, the present invention without transformers, inductors and other magnetic components has thin thickness and small volume to improve the conventional problems.

10 Claims, 8 Drawing Sheets

LIGHT MODULE WITH LINEAR LED SERIAL GROUP DRIVE DEVICE

BACKGROUND OF THE INVENTION

1. Field of the Invention

The invention relates to a light module with linear LED serial group drive device, especially to the linear drive device with an intelligent control without transformers, inductors and other magnetic components.

2. Description of the Related Art

With the mature LED epitaxy and packaging technology, LED has been gradually used in the lighting field, having advantages of energy-saving, environmental protection and long life, and becoming the future mainstream of green energy sources.

The evolution of LED as a light source for illumination is beginning from general light bulbs, street lamps, to ceiling or light steel frame embedded lamps. Comparing with only one or multiple LED light bulbs, the above mentioned LED lamp is composed of dozens tandem of LEDs, so the drive circuit is different from the drive circuit of the general LED bulbs. Thus, constant current problems of the LED serial group must be considered.

Figure 1:
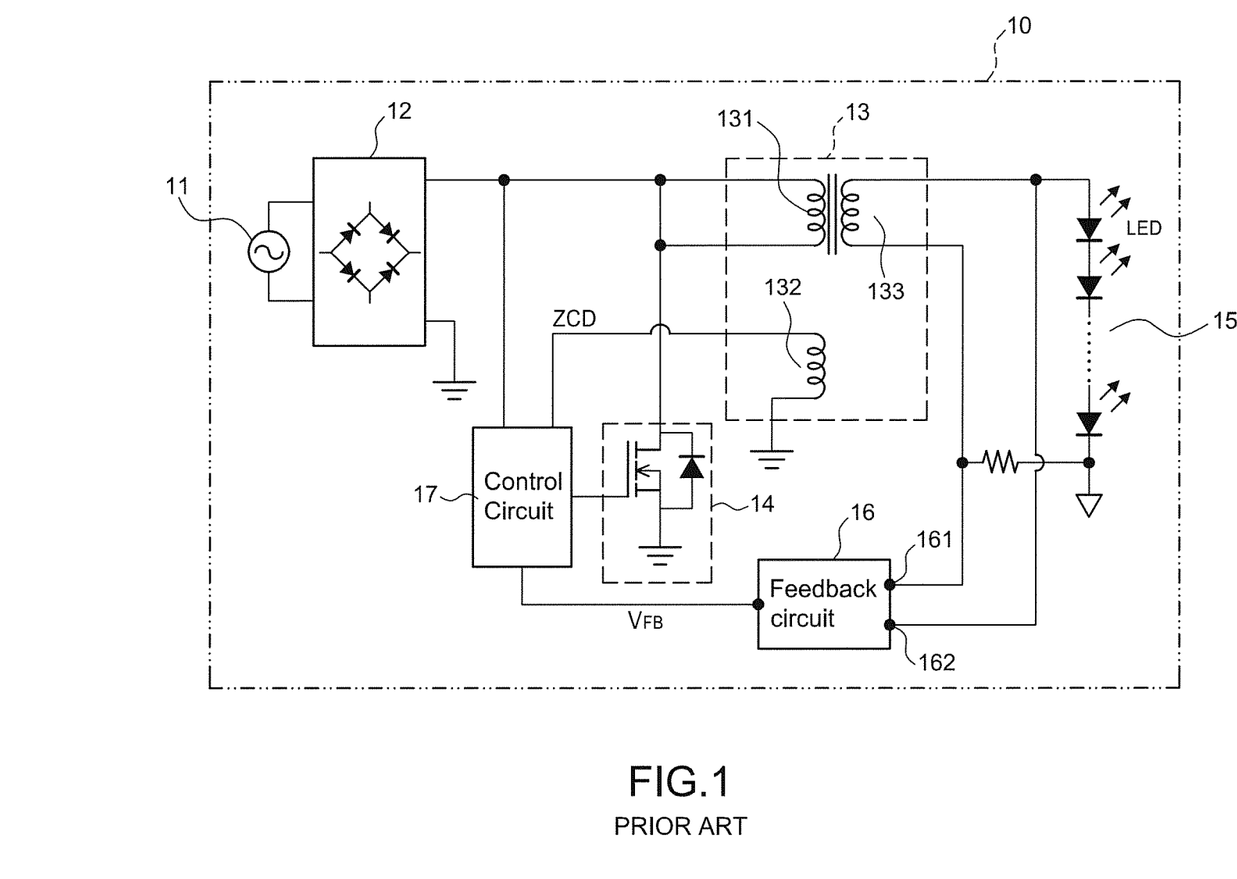
FIG. 1 is a schematic view of the conventional drive circuit.

With the referenced to FIG. 1, a drive circuit 10 of LED serial group comprises a bridge rectifier 33 coupled to an AC power 11, a transformer 13 having a first primary winding 131, a second primary winding 132 and a secondary winding 133, wherein the first primary winding 131 has an end coupled to the bridge rectifier 33, and another end coupled to a switch 14. The second primary winding 132 has an end coupled to the ground, and anther end produces a zero current detection signal. Further, the secondary winding 133 has a first end coupled to an LED serial group 15. A feedback circuit 16 has an input end 161 coupled to a second end of the secondary winding 133, and a second input end coupled to the first end of the secondary winding 133. A feedback signal is generated according to the input current from the second end of the secondary winding 133 and the input voltage from the first end of the secondary winding 133 to control the switch 14 in frequency way; such that the LED serial group 15 can work under constant current, and a control circuit 17 can control the power factor of the LED serial group 15. Such switching LED drive circuit is disclosed in Taiwan Utility Patent No. M435796.

The conventional switching LED drive circuit must use the magnetic components, such as: transformers or inductors. These magnetic components for driving the LED serial group 15 have an adverse impact. There is room for improvement.

Besides, the conventional LED serial group is set on a strip-type circuit board, and the traditional switching LED drive circuit will affect the arrangement of the LED on a side of the uniformity strip-type circuit board, and the Luminance uniformity.

SUMMARY OF THE INVENTION

It is the main object of the present invention to provide a light module with linear LED serial group drive device without transformers, inductors and other magnetic components having thin thickness and small volume to improve the conventional problems.

It is the second object of the present invention to provide an intelligent control includes the voltage detection controller, so when the input voltage is higher than the set start voltage of the LED serial group, the corresponding constant current control drive circuit switch is turned on immediately by the intelligent control to control the power, luminous flux, and power factor of the LED serial light module for achieving stable power output of LED light source.

It is the third object of the present invention to provide a light module with linear LED serial group drive device having an LED light module with low cost and high reliability.

It is the fourth object of the present invention to provide a light module with linear LED serial group drive device having the LED light module with high power factor.

It is the fifth object of the present invention to provide a light module with linear LED serial group drive device having the LED light module to overcome the interference (EMI) problems.

It is the sixth object of the present invention to provide a light module with linear LED serial group drive device having the LED light module which can be used with a TRIAC dimmer.

It is the last object of the present invention to provide a light module with linear LED serial group drive device having multiple intelligent controls which can be used in parallel, or in connection with the control switching points.

In order to achieve the above objects, the light module with linear LED serial group drive device comprises an AC input rectifier unit having an input end coupled to an AC Power to convert an AC half-wave voltage signal into a DC full-wave voltage signal for output; an operating voltage control unit having a first end coupled to the AC input rectifier unit via a first passive element, and a second end coupled to ground via a second passive element; a microprocessor coupled to the operating voltage control unit; a dimming control unit coupled between the AC input rectifier unit, operating voltage control unit, and microprocessor; a current setting unit coupled to the microprocessor; an EMI suppression unit having an end coupled to an output end of the AC input rectifier unit via a third passive element, and another end coupled to the microprocessor; an LED serial light module composed of a plurality of LEDs serially connected to each other, the LED serial light module divided into one or more LED groups L1~Ln, and the LED serial light module having a current input end coupled to an output end of the DC full-wave voltage signal; one or more switch units corresponding to the LED groups L1~Ln having one or more of switches SW1~SWn, and the switches SW1~SWn having an end coupled to the microprocessor, and another end coupled to the current output end of the LED groups L1~Ln.

Whereby an intelligent control is composed of the operating voltage control unit, microprocessor, dimming control unit, current setting unit, EMI suppression unit, and the switch unit; the LED serial light module is divided into a plurality of the LED groups L1~Ln which are respectively controlled by the input points of the switch unit; when the DC full-wave voltage signal is higher than the set voltage across the first LED group L1, the first switch SW1 of the switch unit is turned on for lighting on the first LED group L1, and outputting the set current; when the DC full-wave voltage signal is higher than the set voltage across the first LED group L1 and the second LED group L2, the second switch SW2 of the switch unit is turned on for lighting on the first LED group L1 and the second LED group L2, and outputting the set current; accordingly, the switches SW1~SWn are turned on in sequence to control the power, luminous flux, and power factor of the LED serial light module.

Further, the AC input rectifier unit includes a bridge rectifier, and a surge absorber and capacitor filter connected in parallel and coupled between the AC power and the bridge rectifier.

The present invention further comprises a protection unit coupled to the microprocessor, and the protection unit composed of an overvoltage protection circuit, an overcurrent protection circuit or an over-temperature protection circuit, or a combination of multiple protection circuits.

Further, the intelligent control may be used in multiple parallel, or be used in connection with the control switching points.

The present invention further comprises a circuit board for setting the AC input rectifier unit, intelligent control, and LED serial light module; the circuit board in a strip or plate shape includes a voltage detection controller.

Based on the features disclosed, the intelligent control includes the voltage detection controller, so that when the input voltage is higher than the set start voltage of the LED serial group, the corresponding constant current control drive circuit switch is turned on immediately by the intelligent control to control the power, luminous flux, and power factor of the LED serial light module for achieving stable power output of LED light source. Moreover, the present invention without transformers, inductors and other magnetic components has thin thickness and small volume to improve the conventional problems.

DETAILED DESCRIPTION OF THE PREFERRED EMBODIMENT

Referring to FIGS. 2 through 5, the preferred embodiment of a light module with linear LED serial group drive device in accordance with the present invention comprises the following components as discussed in detail below.

Figure 2:
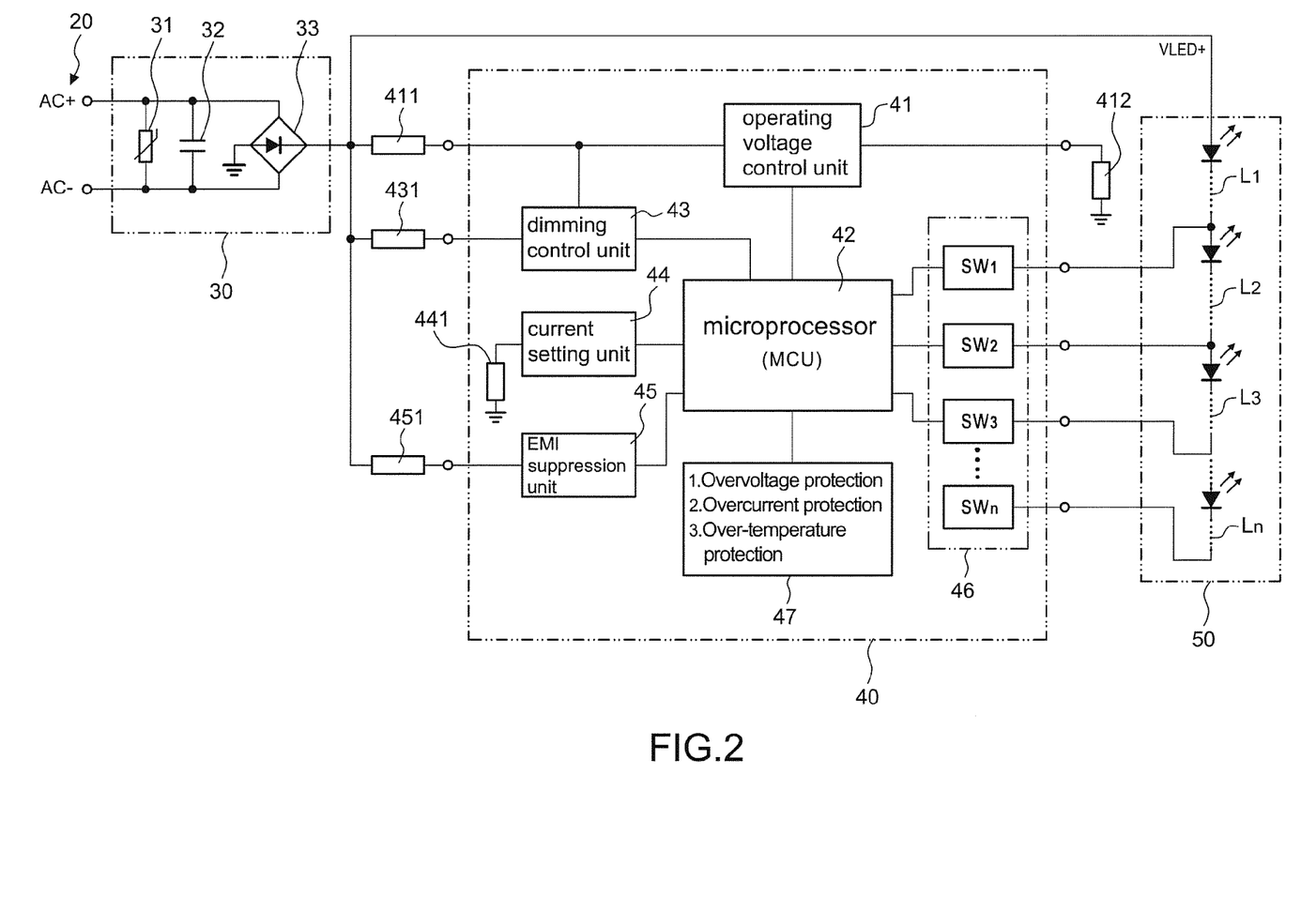
FIG. 2 is a block diagram of the drive device in accordance with the present invention.
Figure 3:
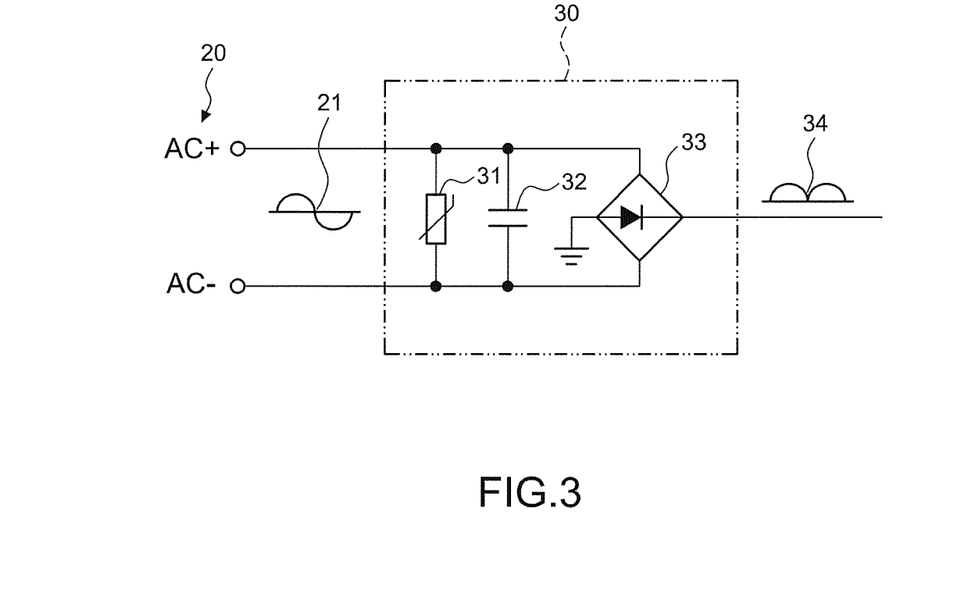
FIG. 3 is a circuit diagram of the AC input rectifier unit in accordance with the present invention.

An AC input rectifier unit 30 has an input end coupled to an AC Power 20 to convert an AC half-wave voltage signal 21 into a DC full-wave voltage signal 34 for output. In the embodiment, the AC input rectifier unit 30 includes a bridge rectifier 33, and a surge absorber 31 and capacitor filter 32 connected in parallel and coupled between the AC power 20 and the bridge rectifier 33.

An intelligent control 40 includes an operating voltage control unit 41 having a first end coupled to the AC input rectifier unit 30 via a first passive element 411, and a second end coupled to ground via a second passive element 412.

A microprocessor 42 is coupled to the operating voltage control unit 41 to control the constant current outputting the DC full-wave voltage signal VLED+ of the operating voltage control unit 41.

A dimming control unit 43 is coupled between the AC input rectifier unit 30, operating voltage control unit 41, and microprocessor 42. The dimming control unit 43 may be a triac dimmer and has an end coupled to a forth passive element 431. In the embodiment, the dimming control unit 43 is a traditional triac dimmer. The intelligent control 40 also contains this feature so the use of the dimming is the same as the traditional way.

A current setting unit 44 is coupled to the microprocessor 42, and the current setting unit 44 is grounded by a fifth passive element 441.

An EMI suppression unit 45 has an end coupled to an output end of the AC input rectifier unit 30 via a third passive element 451, and another end coupled to the microprocessor 42. The EMI suppression unit 45 is composed of a slow start circuit.

A LED serial light module 50 is composed of a plurality of LEDs serially connected to each other, the LED serial light module 50 divided into one or more LED groups L1~Ln, and the LED serial light module 50 having a current input end coupled to an output end of the DC full-wave voltage signal 34;

One or more switch units 46 corresponding to the LED groups L1~Ln having one or more of switches SW1~SWn, and the switches SW1~SWn having an end coupled to the microprocessor 42, and another end coupled to the current output end of the LED groups L1~Ln. The switch unit 46 is composed of a MOS transistor, an organic transistor, or a molecular transistor.

Figure 4:
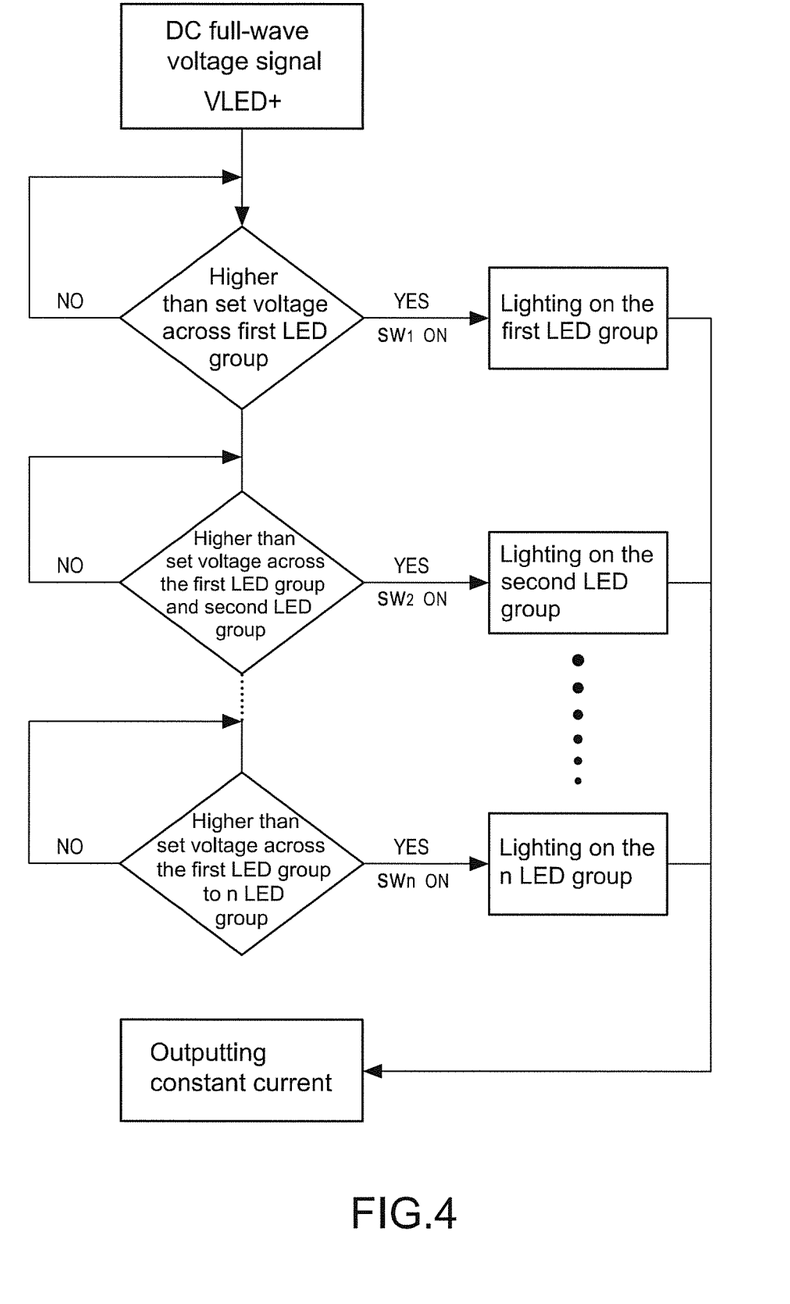
FIG. 4 is a flow diagram, showing the present invention turning on the LED groups.
Figure 5:
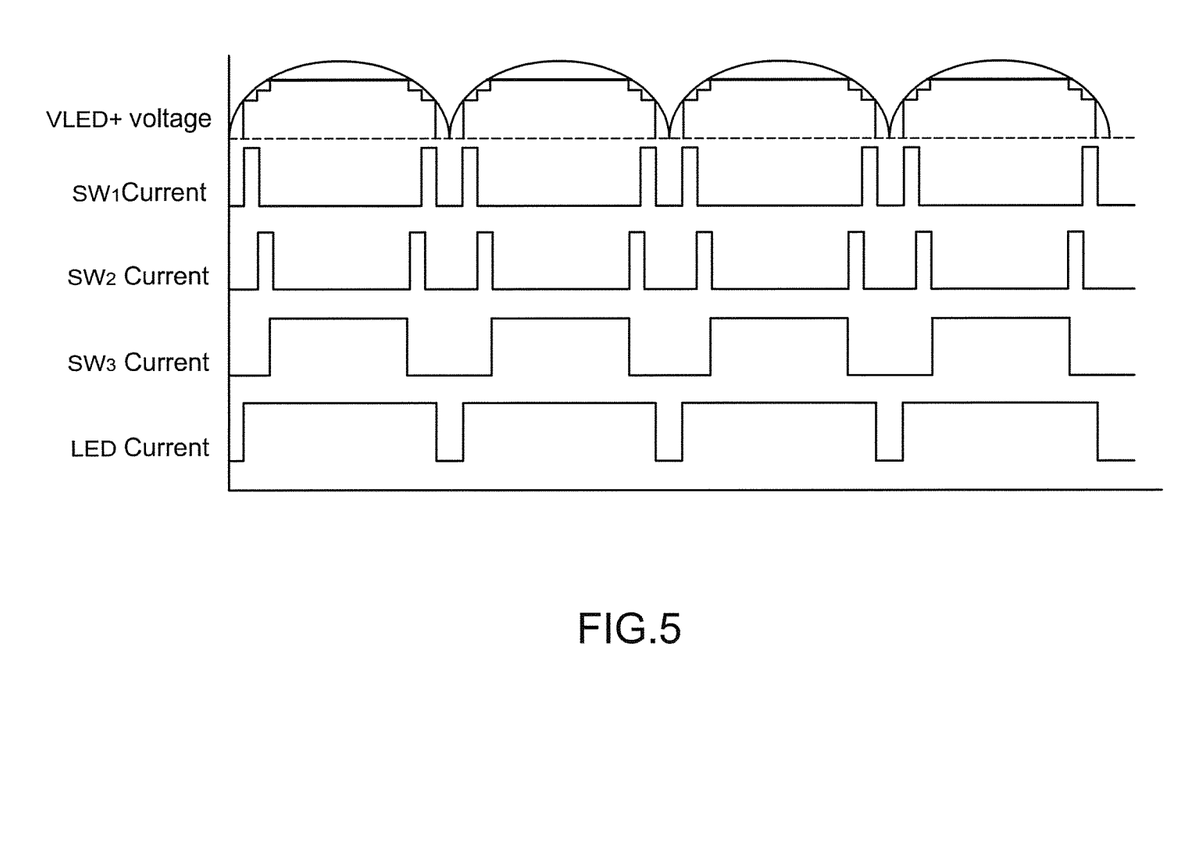
FIG. 5 is a logic diagram, showing the intelligent control actuation of the present invention.

With the referenced to FIGS. 4 and 5, the intelligent control 40 is composed of the operating voltage control unit 41, microprocessor 42, dimming control unit 43, current setting unit 44, EMI suppression unit 45, and the switch unit. The LED serial light module 50 is divided into a plurality of the LED groups L1~Ln which are respectively controlled by the input points of the switch unit 46. When the DC full-wave voltage signal is higher than the set voltage across the first LED group L1, the first switch SW1 of the switch unit 46 is turned on for lighting on the first LED group L1, and outputting the set current. When the DC full-wave voltage signal is higher than the set voltage across the first LED group L1 and the second LED group L2, the second switch SW2 of the switch unit 46 is turned on for lighting on the first LED group L1 and the second LED group L2, and outputting the set current; accordingly, the switches SW1~SWn are turned on in sequence to control the power, luminous flux, and power factor of the LED serial light module 50.

The first, third, fourth, and fifth passive elements 411, 451, 431, 441 are composed of the electric resistances, and the second passive element 412 is composed of the electric capacity but it is not a limitation; that is, any equivalent passive element can be implemented.

The present invention further comprises a protection unit 47 coupled to the microprocessor 42. The protection unit 47 is composed of an overvoltage protection circuit, an overcurrent protection circuit or an over-temperature protection circuit, or a combination of multiple protection circuits to cut off the power input for safety when the voltage, current, or temperature is too high.

Figure 6A:
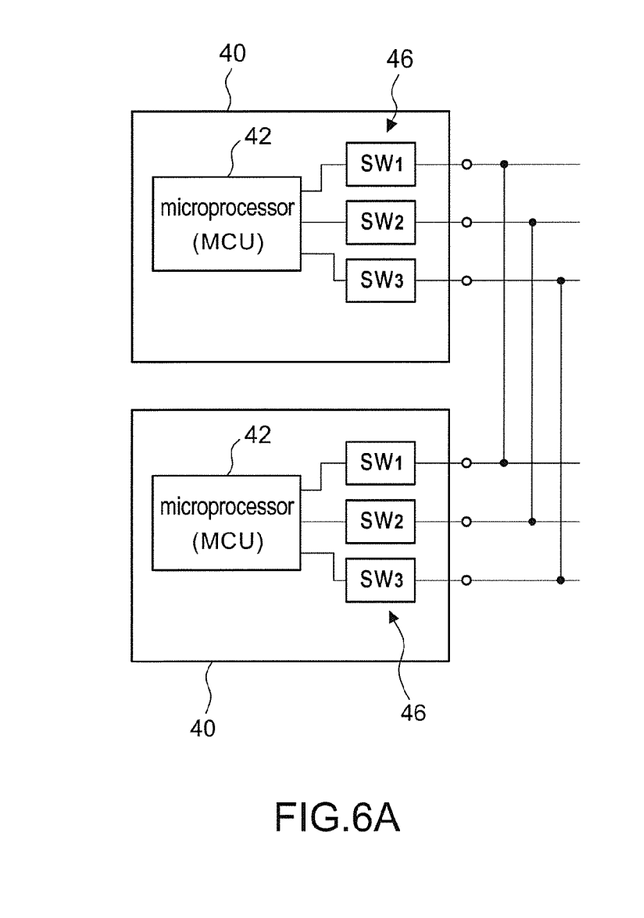
FIG. 6A is a schematic view of the present invention, showing the multiple intelligent controls used in parallel connection.
Figure 6B:
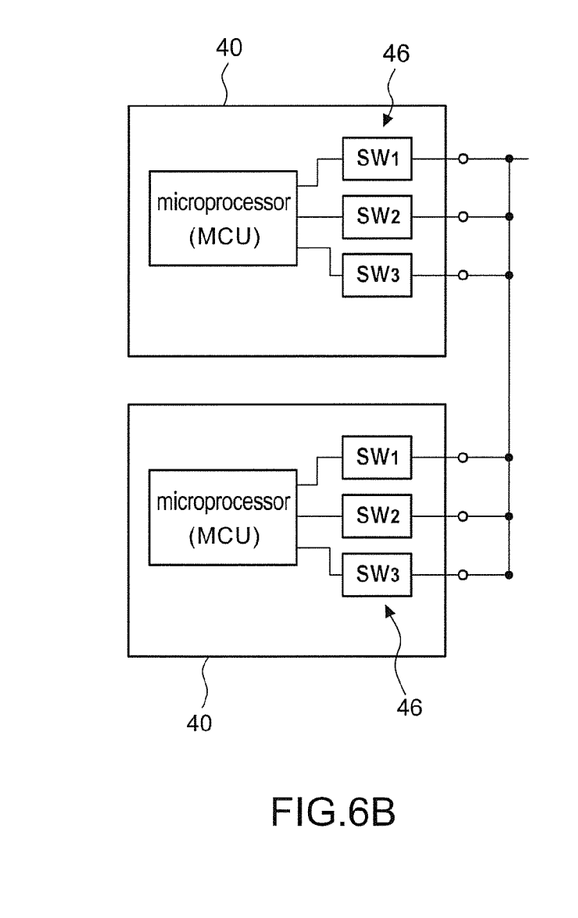
FIG. 6B is a schematic view of the present invention, showing the multiple intelligent controls used in connection with the control switching points.

With the referenced to FIGS. 6A and 6B, the intelligent control IC 40 may be used in multiple parallel, or be used in connection with the control switching points.

Figure 7A:
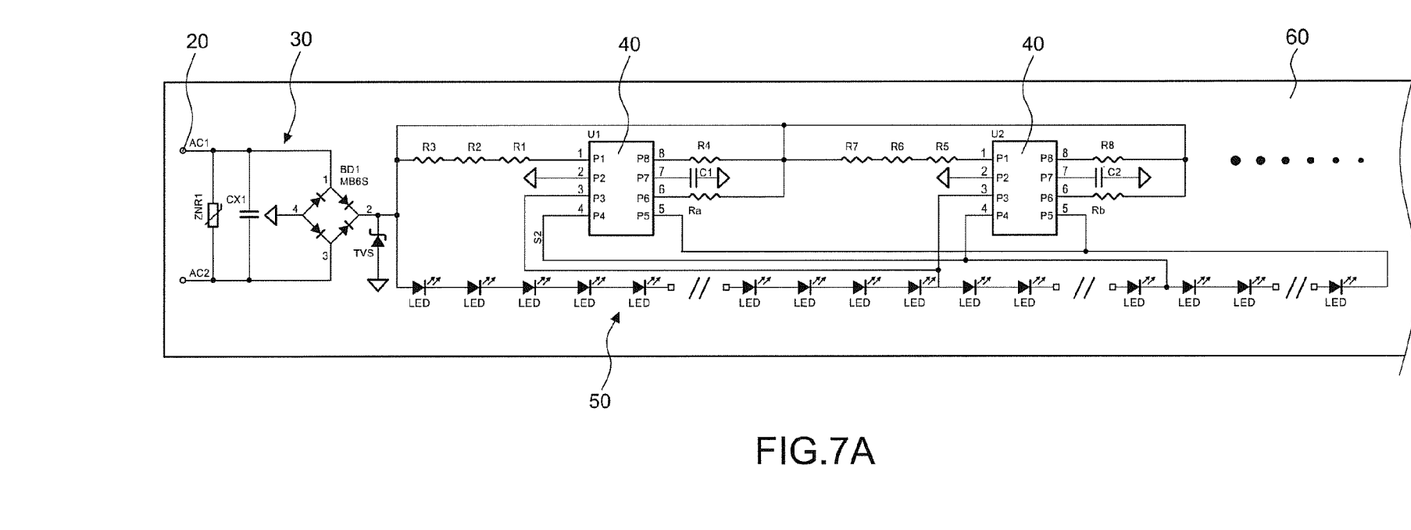
FIG. 7A is a reference figure, showing the present invention used in the light module.
Figure 7B:
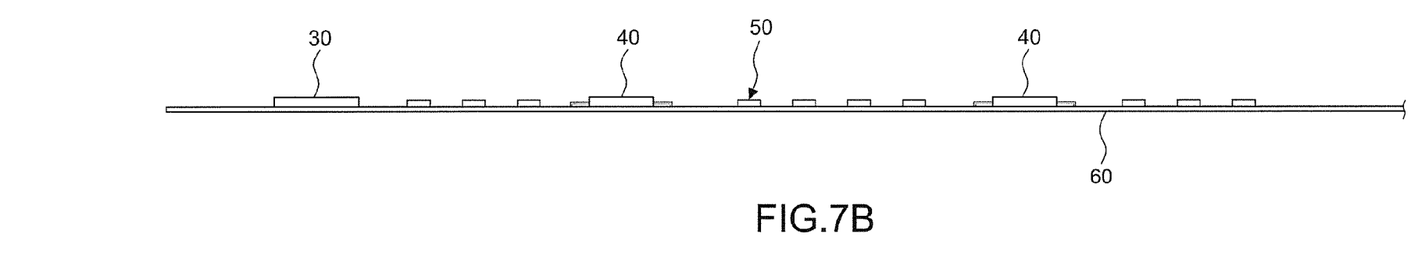
FIG. 7B is a side elevational view, showing the present invention used in the light module.

With the referenced to FIG. 7A, the present invention further comprises a circuit board 60 for setting the AC input rectifier unit 30, intelligent control 40, and LED serial light module 50, and the circuit board 60 may be in a strip or plate shape to form a light bar or light board light module. With the referenced to FIG. 7A, the circuit board 60 is still thin and small, and easy to be installed in the lamp tube or the lamp plate after the circuit board 60 has the above elements disposed thereon.

Figure 8:
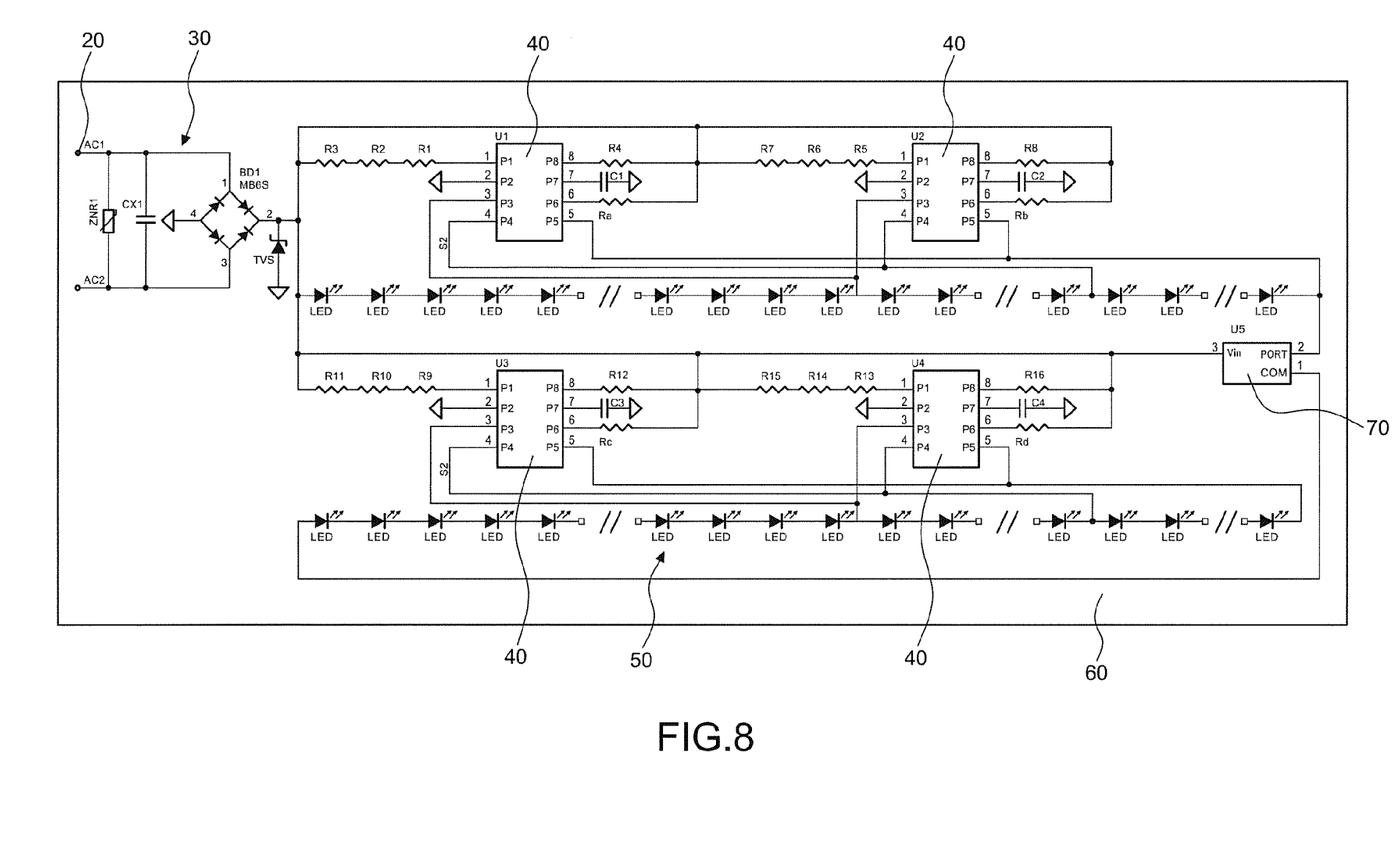
FIG. 8 is a schematic view of another applicable embodiment in accordance with the present invention.

With the referenced to FIG. 8, the present invention in another applicable embodiment includes a voltage detection controller 70 disposed on the circuit board 60. When a high voltage input is detected, it will automatically switch to another high-voltage architecture that enables the present invention to satisfy the input architecture with two different voltage power supplies.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A light module with linear LED serial group drive device, comprising:
   an AC input rectifier unit having an input end coupled to an AC Power to convert an AC half-wave voltage signal into a DC full-wave voltage signal for output;
   an operating voltage control unit having a first end coupled to the AC input rectifier unit via a first passive element, and a second end coupled to ground via a second passive element;
   a microprocessor coupled to the operating voltage control unit;
   a dimming control unit coupled between the AC input rectifier unit, operating voltage control unit, and microprocessor;
   a current setting unit coupled to the microprocessor;
   an EMI suppression unit having an end coupled to an output end of the AC input rectifier unit via a third passive element, and another end coupled to the microprocessor;
   an LED serial light module composed of a plurality of LEDs serially connected to each other, the LED serial light module divided into one or more LED groups (L1~Ln), and the LED serial light module having a current input end coupled to an output end of the DC full-wave voltage signal;
   one or more switch units corresponding to the LED groups (L1~Ln) having one or more of switches (SW1~SWn), and the switches (SW1~SWn) having an end coupled to the microprocessor, and another end coupled to the current output end of the LED groups (L1~Ln);
   whereby an intelligent control is composed of the operating voltage control unit, microprocessor, dimming control unit, current setting unit, EMI suppression unit, and the switch unit; the LED serial light module is divided into a plurality of the LED groups (L1~Ln) which are respectively controlled by the input points of the switch unit; when the DC full-wave voltage signal is higher than the set voltage across the first LED group (L1), the first switch (SW1) of the switch unit is turned on for lighting on the first LED group (L1), and outputting the set current; when the DC full-wave voltage signal is higher than the set voltage across the first LED group (L1) and the second LED group (L2), the second switch (SW2) of the switch unit is turned on for lighting on the first LED group (L1) and the second LED group (L2), and outputting the set current; accordingly, the switches (SW1~SWn) are turned on in sequence to control the power, luminous flux, and power factor of the LED serial light module.

2. The light module with linear LED serial group drive device as claimed in claim 1, wherein the AC input rectifier unit includes a bridge rectifier, and a surge absorber and capacitor filter connected in parallel and coupled between the AC power and the bridge rectifier.

3. The light module with linear LED serial group drive device as claimed in claim 1, wherein the dimming control unit is a triac dimmer and has an end coupled to a forth passive element.

4. The light module with linear LED serial group drive device as claimed in claim 3, wherein the current setting unit is grounded by a fifth passive element.

5. The light module with linear LED serial group drive device as claimed in claim 4, wherein the first, third, fourth, and fifth passive elements are composed of the electric resistances, and the second passive element is composed of the electric capacity.

6. The light module with linear LED serial group drive device as claimed in claim 1, wherein the EMI suppression unit is composed of a slow start circuit.

7. The light module with linear LED serial group drive device as claimed in claim 1, wherein the switch unit is composed of a MOS transistor, an organic transistor or a molecular transistor.

8. The light module with linear LED serial group drive device as claimed in claim 1, further comprising a protection unit coupled to the microprocessor, and the protection unit composed of an overvoltage protection circuit, an overcurrent protection circuit or an over-temperature protection circuit, or a combination of multiple protection circuits.

9. The light module with linear LED serial group drive device as claimed in claim 1, wherein the intelligent control may be used in multiple parallel, or be used in connection with the control switching points.

10. The light module with linear LED serial group drive device as claimed in claim 1, further comprising a circuit board for setting the AC input rectifier unit, intelligent control, and LED serial light module; the circuit board in a strip or plate shape includes a voltage detection controller.

* * * * *